United States Patent

Volk

Patent Number: 5,297,985
Date of Patent: Mar. 29, 1994

[54] CLAMP FOR POULTRY THIGHS AND CARTRIDGE FOR SAME

[76] Inventor: Donald J. Volk, c/o Volk Enterprises, Inc., 1232 South Ave., Turlock, Calif. 95380

[21] Appl. No.: 11,941

[22] Filed: Feb. 1, 1993

[51] Int. Cl.$^5$ .............................................. A22C 21/00
[52] U.S. Cl. .................................................. 452/176
[58] Field of Search ................. 452/176, 174; 206/340

[56] References Cited

U.S. PATENT DOCUMENTS

| | | | |
|---|---|---|---|
| 3,112,515 | 3/1962 | Volk | 17/11 |
| 3,895,415 | 7/1975 | Volk | 17/11 |
| 4,051,573 | 10/1977 | Volk | 17/11 |
| 4,056,865 | 11/1977 | Clayo | 452/174 |
| 4,293,977 | 10/1981 | Volk | 17/11 |
| 4,518,083 | 5/1985 | Mayer | 206/340 |
| 4,615,075 | 10/1986 | Volk | 17/1 |
| 4,653,146 | 3/1987 | Volk | 17/11 |
| 4,739,538 | 4/1988 | Volk | 17/11 |
| 4,771,509 | 9/1988 | Volk | 17/1 |

*Primary Examiner*—Willis Little
*Attorney, Agent, or Firm*—Julian Caplan; Edward N. Bachand

[57] ABSTRACT

A clamp to retain thighs in eviscerated poultry from which the legs and feet have been removed in trussed condition is formed of wire having a central, U-shaped portion. On either side of the U-shaped portion, the wire is symmetric and extends in a backward stretch at about a 90° angle and then bends in an outward stretch into a plane at an angle to both the backward stretch and the U-shaped portion. In the aforesaid plane, the wire extends in an outward-downward stretch, a convex stretch and then a concave stretch. Below the concave stretch is a straight stretch which terminates in a hook stretch at about a 90° angle to the straight stretch. In use, the hook stretches are inserted inside the poultry carcass and their ends fit into the kidney cavities of the carcass. The straight stretches extend out of the tail opening of the carcass. The concave stretches fit alongside the inside of the thighs when they are brought into trussed position, the convex stretches fit alongside the outsides of the thighs and the rearward stretches fit into the creases in the knuckles of the thighs. For shipping and handling, a V-shaped cartridge is used. The central portion of the claim rests in the vertex of the cartridge, the convex stretches extend over the side edges of the cartridge and the concave stretches around the undersides of the sides of the cartridge.

10 Claims, 2 Drawing Sheets

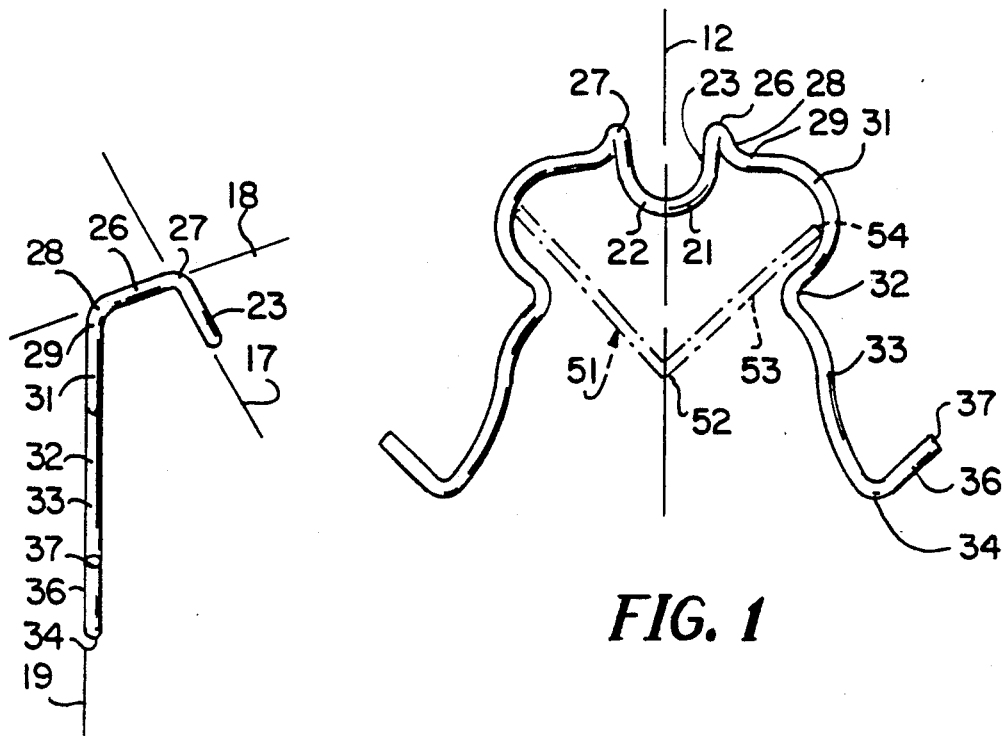
FIG. 1
FIG. 2
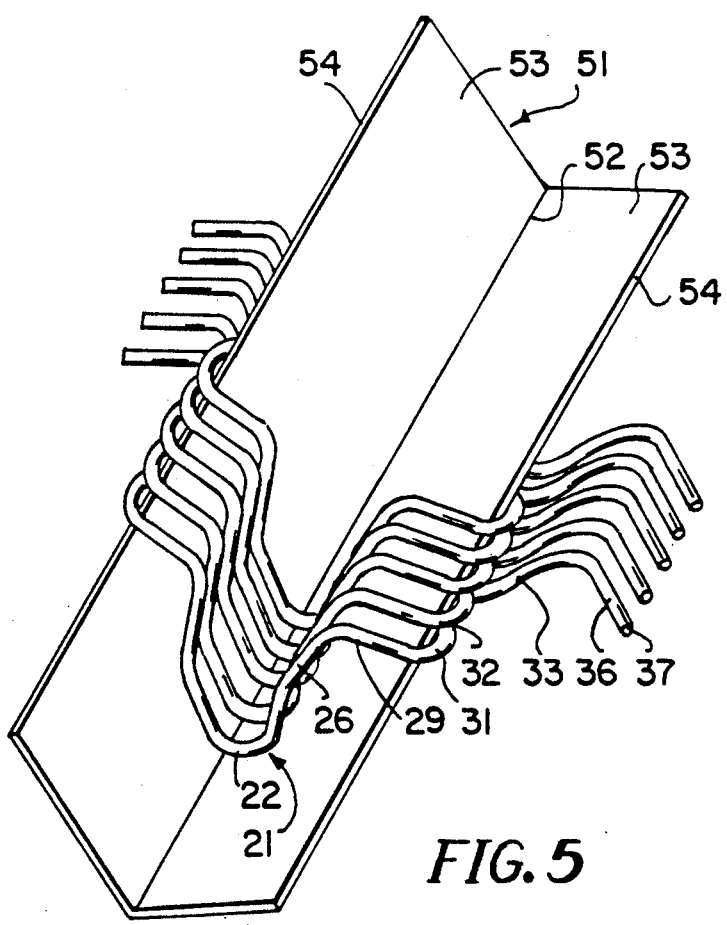
FIG. 5

CLAMP FOR POULTRY THIGHS AND CARTRIDGE FOR SAME

BACKGROUND OF THE INVENTION

1. Field of the Invention

This invention relates to a new and improved clamp for poultry thighs and to the cartridge for shipping and handling the same. More particularly, the invention relates to a wire clamp used in poultry processing to secure the thighs in folded relationship against the carcass and further to a cartridge of cardboard or the like for a quantity of clamps to facilitate retaining the clamps in juxtaposed position during transportation and storage and to facilitate processors removing each clamp as it is being used.

2. Description of Related Art

Wire clamps bent to engage the hocks of poultry have been widely used in the poultry processing industry. Typical clamps of this nature are shown in Volk U.S. Pat. No. 3,112,515 and Volk et al. U.S. Pat. No. 4,293,977. The present invention comprises an improvement in such clamps by forming in each leg thereof a concave bend immediately below the convex bend thereof. The convex stretch fits alongside the outside of the thigh in trussed position while the concave stretch fits along the inside of the thigh, the two curved stretches more securely engaging the thigh so it is not displaced from position during processing and transportation.

U.S. Pat. No. 4,518,083 shows a cartridge or rack for storing multiple clamps in nested relationship formed of a sheet of cardboard or similar material bent into at least three longitudinal folds or bends to define at least four sheet sections. The present invention is used with a cartridge of V-shape having only two sides. Each clamp of the present invention fits alongside a juxtaposed clamp in nested relationship with the central portion of the clamp in the vertex of the V-shaped cartridge, the convex curved portion of the leg extending from the inside of each side of the cartridge over the side edge thereof and the concave wire sections extend along the underside of the cartridge side. The clamps are secured in position by means of a simpler cartridge and are more easily removed, one at a time, by the poultry processor.

SUMMARY OF THE INVENTION

The clamp of the present invention is formed of a rather stiff resilient wire and is symmetric about a central plane. A U-shaped portion at the middle is bent in a rearward-outwardly extending stretch and then a leg stretch lying preferably in a single plane approximately at right angles to the rearward stretch. The leg stretch comprises an outward-downward extending stretch, then a convex stretch followed by a concave stretch. Below the concave stretch is an outward-downward extending straight-leg stretch and at the lower end thereof is an outward directed hook stretch. The aforesaid leg stretch differs from U.S. Pat. No. 4,293,977, for example, in the presence of the concave stretch heretofore described.

In use, the poultry processor grips the legs of the clamp and pinches them together. Since the fingers of the processor tend to be slippery by reason of frequent contact with poultry carcasses, the concave bends of the legs facilitate gripping the legs for pinching purposes. The legs are inserted through the tail opening of the carcass and the legs are released, allowing the hooks to extend into the kidney cavities of the bone structure of the carcass.

The thighs (from which the lower legs have been removed) are drawn together. The concave leg stretches fit alongside the insides of the thighs, the convex stretches fit over and around the outsides of the thighs, drawing the thighs inwardly until the knuckles meet over the tail opening. Further to secure the thighs in place, the backward stretches fit into the creases of the knuckles of the thighs.

It will be understood that during subsequent processing the carcasses are subjected to considerable jarring which might otherwise tend to dislodge the thighs from trussed position. The same jarring exists when the carcasses are being bagged, chilled or frozen and shipped. The present invention retains the thighs in position better than in previous commercially available clamps.

Cardboard cartridges for handling clamps are shown in U.S. Pat. No. 4,518,083. The cartridge of the present invention consists of two sides bent in a V-shape. Such a simple cartridge adequately holds the clamps in juxtaposed position by reason of the fact that the central portion of the clamp rests in the vertex of the V-shaped cartridge, and, on either side, the concave portion extends around over the outside edge of one side of the cartridge and the concave stretch of the leg fits along the underside of the side of the cartridge. Placing the clamps in the cartridges is facilitated by the construction of the clamps as well as the simplification of the shape of the cartridge, and the same is true when the processor removes each clamp in order as each bird is trussed.

BRIEF DESCRIPTION OF DRAWINGS

FIG. 1 is a front elevational view of a clamp in accordance with the present invention showing the outline of a cartridge for the clamp in dot-and-dash lines.

FIG. 2 is a side elevational view of the clamp of FIG. 1.

FIG. 5 is a perspective view showing a plurality of clamps juxtaposed in position on a cartridge.

DESCRIPTION OF PREFERRED EMBODIMENT

Figure 3:
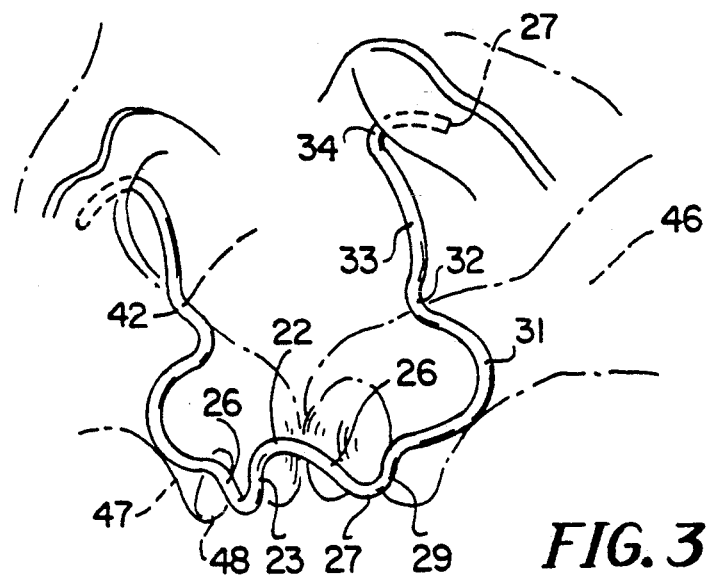
FIG. 3 is a perspective view showing the clamp in use in trussing a carcass.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The clamp of the present invention is preferably formed of a single piece of wire and is of a material which is generally rigid but sufficiently bendable so that it can be bent in the various stretches and curves hereinafter described and is, when bent, somewhat resilient so that the legs of the clamp may be pinched together to facilitate insertion of the clamp in the tail opening of a poultry carcass. Stainless steel or galvanized steel wire of about 0.076 to 0.099 mil thickness is a suitable material of construction.

As shown in FIG. 1, the clamp is symmetric about a central axis 16. In plane 17 (see FIG. 2) is a central U-shaped portion 21 having a middle 22 and upward extending sides 23. Since the clamp is symmetric about the plane of central axis 16, the shape of the clamp will be described only with respect to one side. Thus, a downward-rearward-outward extending rearward stretch 26 is connected to side 23 at a bend 27. Stretch 26 lies in plane 18 disposed at an angle of approximately 80° relative to plane 17. At the rearward-outward end of stretch 26 is a bend 28 joined to outward-downward stretch 29. Stretch 29 and all stretches beyond stretch 29 are generally referred to herein as the "legs" of the clamp. Stretch 29 is disposed approximately at a 90° angle with respect to stretch 26. The distal end of stretch 29 merges into convex stretch 31 and the distal end of stretch 31 merges into a concave stretch 32. Below stretch 32, the leg extends into a straight stretch 33. At the lower end of stretch 33 is an approximately 90° bend 34 from which extends straight hook portion 36 terminating in an end 37.

The relative proportions of the aforesaid clamp are subject to variation depending upon the size of the poultry with which they are intended to be used. It will be understood that although the legs lie in plane 19 at an angle of approximately 110° relative to plane 18, it is not essential that the legs lie in a single plane.

Figure 4:
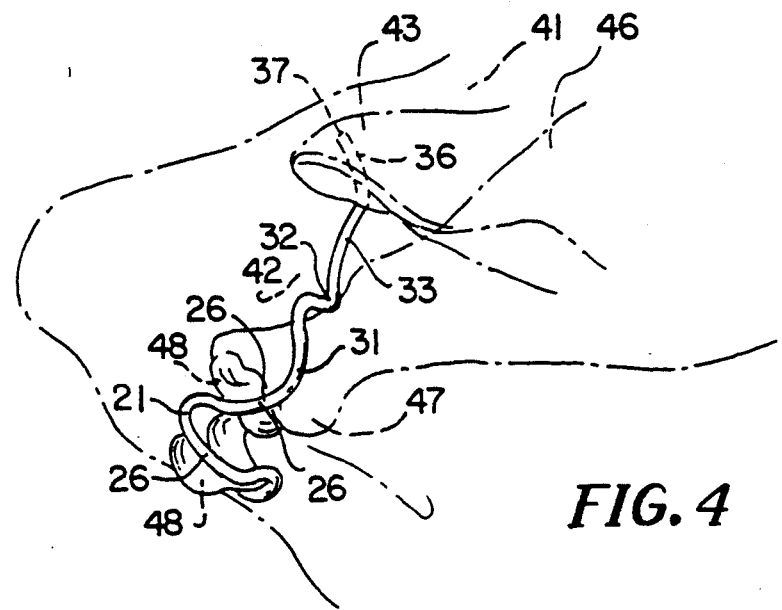
FIG. 4 is a view similar to FIG. 3 showing the carcass in a different position.

A preferred use of the clamp is shown in FIGS. 3 and 4. In these views, the tail of the carcass has been cut away to facilitate understanding of the positioning of the clamp in the carcass. Thus, carcass 41 has a tail opening indicated generally by reference numeral 42, it being understood that in conventional processing, the carcass is eviscerated through the opening 42 and then the opening is at least partially closed by tucking portions of the skin inside the thighs 46. Indicated generally by reference numeral 43 are "kidney cavities" which are natural openings in the bone structure of the carcass 41.

Thighs 46 are trussed by use of the clamp of the present invention. It will be understood that the legs and feet below the knuckles 47 of thigh 46 have been removed. A natural occurrence in the knuckle 47 is a central crease 48.

In use of the clamp, the leg portions are pinched together so that the ends 37 are a minimum distance apart and can readily be inserted through the tail opening 42. The concave stretches 32 assist the processor in gripping the clamp, even if the fingers are slippery. Upon release of the legs, the ends 37 are lodged in the kidney cavities 43 and the hook portions 36 extend out through the tail opening 42.

In accordance with the present invention, the concave stretches 32 extend along the insides of the thighs 46 while the convex stretches 31 extend along the outsides of the thighs. This arrangement more securely grips the thighs and prevents their dislodgement from trussed position during processing, bagging and transportation. The rearward stretch 26 fits into the crease 28 in knuckle 47 and further restrains movement of thigh 46 from trussed position. U-shaped portion 21 is a convenient means whereby the carcass may be gripped for conveying from one position to the other.

The shape of the legs as heretofore described facilitates use of the cartridge 51 shown in FIGS. 1 and 5. Cartridge 51 is V-shaped having a vertex crease 52 with sides 53 disposed approximately at 90° angles to each other. Sides 53 terminate in outer side edges 54. Nested clamps may be loaded into cartridge 51 in juxtaposed position so that they are not dislodged or tangled during transportation or storage. Further, the positioning of the clamps in tray-like arrangement as shown in FIG. 5 enables the poultry processor to grip each clamp in turn without displacing the remaining clamps.

Thus, the middle 22 of U-shaped portion 21 is located at the vertex 52. The convex stretches 31 extend from the inside of the cartridge up over the side edges 54. The concave stretches 32 lie on the undersides of the cartridge sides 53.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a trussing clamp for poultry formed of a single wire comprising a U-shaped central portion and on either side of said central portion lying in a first plane, a rearward extending stretch in second plane disposed at an angle to said central portion, and a leg portion disposed at an angle to said rearward stretch, the improvement comprising in said leg portion an outward-downward stretch, a convex stretch below said outward-downward stretch, a concave stretch below said convex stretch, a relatively straight stretch below said concave stretch and a hook disposed about 90° outward from the lower end of said straight stretch.

2. A clamp according to claim 1 in which said legs are shaped to extend through a tail opening in said poultry, with said hooks extending into kidney cavities in the bone structure of the carcass of poultry, said concave stretch being located to lie against the insides of the thighs of said poultry, said convex stretch being located to lie against the outsides of said thighs, said rearward extending stretches being located to fit across the creases in the knuckles of the thighs.

3. A clamp according to claim 1 in which said concave and said convex stretches are contiguous.

4. A clamp according to claim 3 in which said convex stretch is larger than said concave stretch.

5. A clamp according to claim 1 in which said straight stretch is approximately as long as the combined lengths of said concave and convex stretches.

6. A clamp according to claim 1 in which said leg portion lies in a single third plane.

7. A clamp according to claim 6 in which said third plane is at an obtuse angle to said second plane.

8. A clamp according to claim 7 in which said second plane is at an obtuse angle to said first plane.

9. In combination, a clamp according to claim 1 and a cartridge, said cartridge comprising an elongated narrow sheet folded into V-shape at a vertex and a pair of sides extending outward from said vertex, said sides having side edges, said central portion being disposed at said vertex, said convex stretches curving outwardly over said side edges, said concave stretches being disposed on the undersides of said cartridge sides.

10. A combination according to claim 9 which further comprises a plurality of clamps juxtaposed side-by-side parallel to said first-mentioned clamp.

* * * * *